(12) United States Patent
Nock

(10) Patent No.: US 7,406,926 B2
(45) Date of Patent: Aug. 5, 2008

(54) BIRD FEEDER PORT

(75) Inventor: Robert Kenneth Nock, Malta (GB)

(73) Assignee: C J Wildbird Foods Limited, Shrewsbury (GB)

( * ) Notice: Subject to any disclaimer, the term of this patent is extended or adjusted under 35 U.S.C. 154(b) by 0 days.

(21) Appl. No.: 11/356,024

(22) Filed: Feb. 17, 2006

(65) Prior Publication Data

US 2006/0180088 A1    Aug. 17, 2006

(30) Foreign Application Priority Data

Feb. 17, 2005    (GB) ................. 0503260.2

(51) Int. Cl.
*A01K 61/02*    (2006.01)
(52) U.S. Cl. ............ 119/57.9; 119/52.2; 119/52.3; 119/57.8; 119/429
(58) Field of Classification Search ............. 119/52.2, 119/52.3, 57.8, 57.9, 429
See application file for complete search history.

(56) References Cited

U.S. PATENT DOCUMENTS

| | | | |
|---|---|---|---|
| 3,568,641 A | 3/1971 | Kilham | |
| 4,829,934 A | 5/1989 | Blasbalg | |
| 5,722,334 A | 3/1998 | Rank | |
| 6,408,788 B1 | 6/2002 | Lieb et al. | |
| 6,863,024 B1 * | 3/2005 | Obenshain | 119/57.8 |
| 7,093,561 B2 * | 8/2006 | Rich et al. | 119/57.8 |
| 2004/0216684 A1 * | 11/2004 | Obenshain | 119/57.9 |

FOREIGN PATENT DOCUMENTS

| | | |
|---|---|---|
| CA | 2 410 241 A1 | 7/2003 |
| GB | 2 398 719 A | 9/2004 |

OTHER PUBLICATIONS

CJ Wildbird Foods, Handbook of Garden Wildlife 2004-2005, pp. 21-30 (Aug. 2004).

* cited by examiner

*Primary Examiner*—Michael J. Carone
*Assistant Examiner*—Willie W Berry
(74) *Attorney, Agent, or Firm*—Buchanan Ingersoll & Rooney PC

(57) ABSTRACT

A bird feeder port, especially suited for dispensing fine sized birdseed and configured for insertion through an exterior wall of a bird feeder; the port comprising a feed distributor with an open front portion accessible to a bird and in addition having at least an upper portion and a lower portion; said lower portion having an aperture in the lowermost floor portion through which bird seed is in use presented and can be eaten by a feeding bird. The aperture preferably comprises a slot and has a width of between 5 and 13 mm.

13 Claims, 4 Drawing Sheets

BIRD FEEDER PORT

BACKGROUND OF INVENTION

The present invention relates to bird feeding equipment and in particular to a bird feeder port; either alone or as part of a bird feeder.

Bird feeders which store seed in a cylindrical vessel typically dispense seed through apertures in the wall. If a simple aperture is used it is typically circular in shape, having a diameter somewhat larger than the maximum seed dimension. Such feeders are typically used for dispensing fine seed; such as Nyjer seed to small birds. However, such feeders suffer the disadvantage that a significant proportion of the seed is wasted due to feed intermittently escaping through the aperture and falling to the ground where other animals can eat it. A general solution to this problem is to use a seed port; this helps retain seed within the bird feeder body. Ports typically comprise a member with an aperture and roof, but no floor, and are configured so that they may be inserted in alignment with a corresponding aperture in the wall of a bird feeder. However, such ports are generally ineffective in retaining fine sized bird seed, such as Nyjer seed.

BRIEF SUMMARY OF INVENTION

It is an object of the present invention to provide an improved seed port for use with a bird feeder. Another object of the invention is to provide a seed port that is particularly suitable for dispensing small sized seed, such as Nyjer seed.

In one aspect the invention comprises a bird feeder port, for insertion through an exterior wall of a bird feeder, comprising a feed distributor with an open front portion accessible to a bird and having at least one of a roof portion, a wall portion and a lower portion; an aperture located in said lower portion, through which aperture bird seed is in use presented and can be eaten by a feeding bird; wherein the aperture is rectangular or elliptical in shape; and said aperture has a width in the range 5 to 13 mm. Preferably, the aperture in the lowermost part of the lower portion.

Preferably, the aperture in the lowermost part of the floor portion. Preferably the maximum width of the aperture is in the range 7 to 11 mm, and more preferably in the range 8 to 10 mm. Preferably the aperture is a slot of length 10 to 30 mm, more preferably 12 to 25 mm and most preferably 12 to 20 mm.

Preferably, the upper portion comprises at least a roof portion and a side wall portion and the aperture is located, at least in part, in said floor portion. Preferably, the feed distributor is formed, in at least part, from a cylinder. The feed distributor may be formed, in at least part, from a frustroconical shell.

Preferably, the aperture has an area between 20 mm$^2$ and 400 mm$^2$. Preferably, the aperture is rectangular in shape. The aperture may be circular or elliptical in shape and have a diameter or minor diameter in the range 5 to 13 mm. Preferably, the bird feeder port has a flange portion that in use is located adjacent the outer wall of a bird feeder.

In yet another aspect the invention comprises a bird feeder having a main body in which birdfood may be stored, and a bird feeder port; said port comprising a feed distributor with an open front portion accessible to a bird and in addition having at least an upper portion and a lower portion; said lower portion having an aperture with a maximum width in the range 5 to 13 mm; through which aperture bird seed is in use presented and can be eaten by a feeding bird. The bird feeder may comprise a main body in which birdfood may be stored, and a bird feeder port according to the invention as described above.

It has surprisingly been found during testing of various port configurations that apertures of the above size prevent wastage of small sized bird seed such as Nyjer seed, by allowing free flow to but not through the aperture, if the aperture is located, at least in part, in the lower portion or floor of the distributor. Avoiding very narrow apertures is advantageous as it allows a feeding bird greater access to seed (see below) and also make the port less susceptible to blockage; for example, if the seed becomes damp. If the aperture is located in the floor of the distributor it has the further advantage of allowing a small bird to gain access to seed even when the a bird feeder is almost empty and the seed level has fallen to below the floor level of the distributor.

BRIEF DESCRIPTION OF DRAWINGS

The invention will now be described by reference to the following diagrammatic figures in which.

DETAILED DESCRIPTION OF INVENTION

Figure 1:
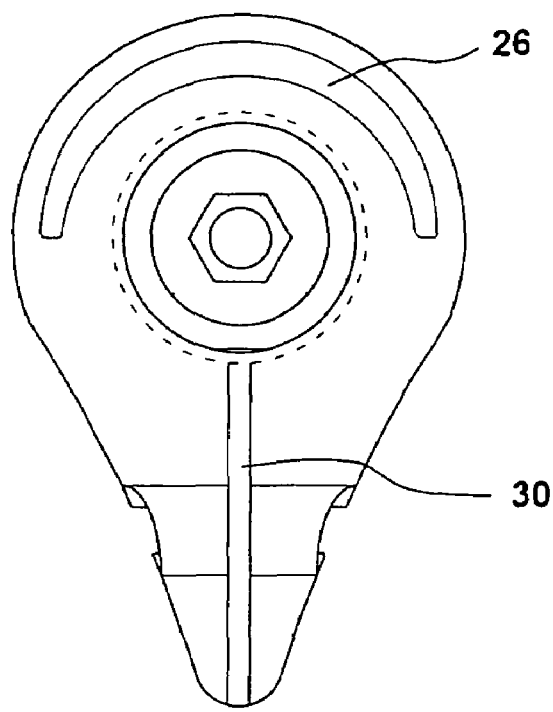
FIG. 1 shows a front view of a seed port according to the invention.
Figure 2:
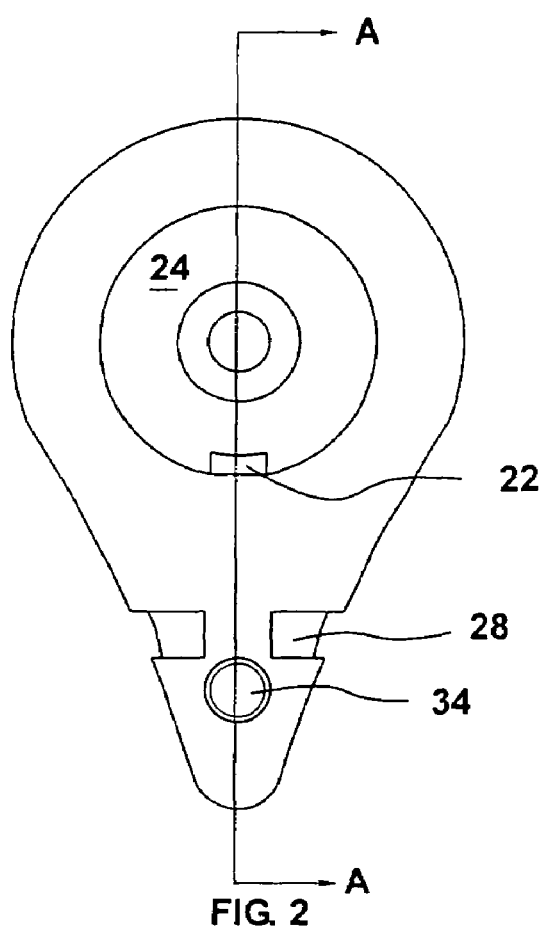
FIG. 2 shows a rear view of the seed port of FIG. 1.
Figure 3:
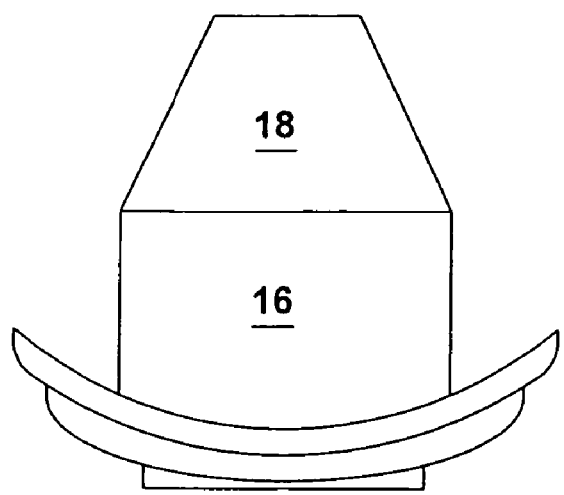
FIG. 3 shows a plan view of the port of FIG. 1.
Figure 4:
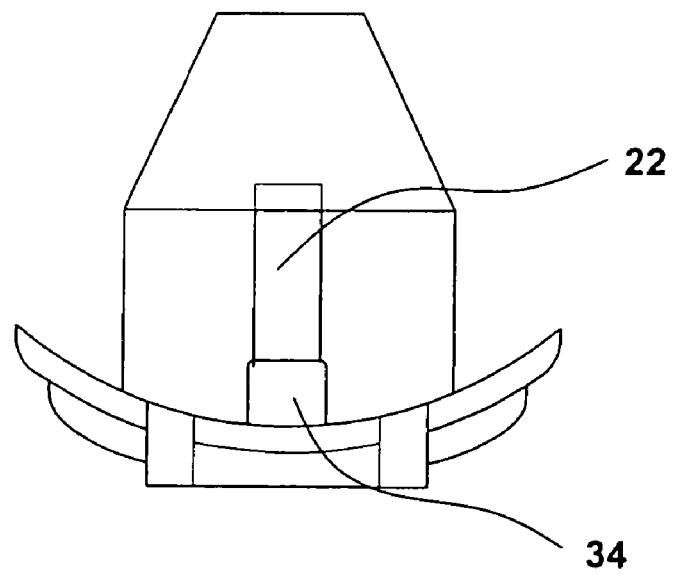
FIG. 4 shows an underside view of the port of FIG. 1.
Figure 5:
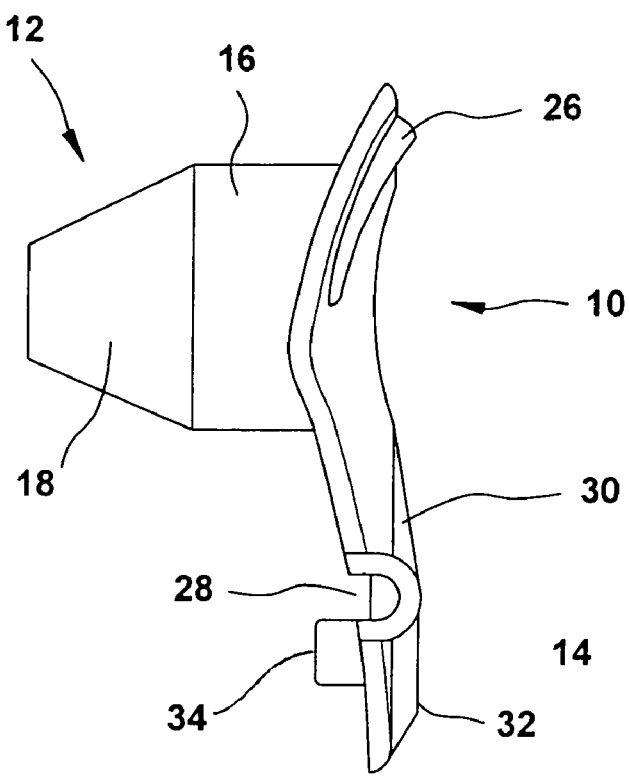
FIG. 5 shows a side view of the port of FIG. 1.
Figure 6:
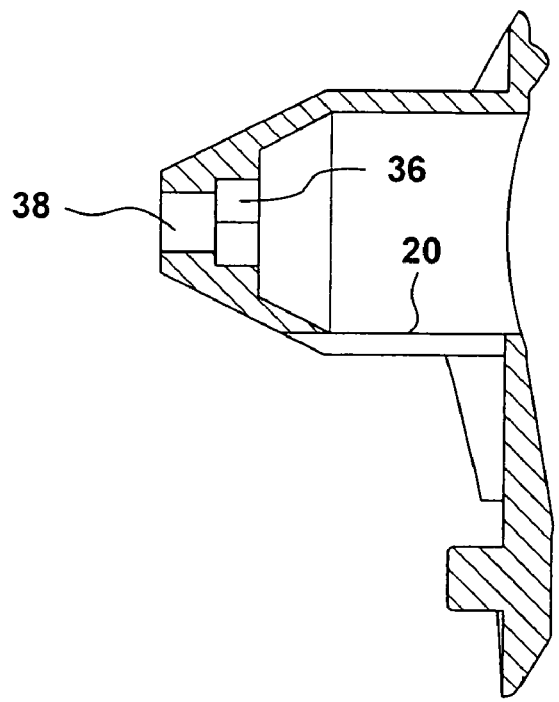
FIG. 6 is a sectioned side view along the lines A-A' of FIG. 2.

A preferred embodiment will now be described by reference to FIGS. 1 to 6. The seed port 10 comprises a feed distributor 12 and a flange 14. Feed distributor 12 comprises a cylindrical portion 16 and a frustroconical portion 18. The floor 20 of cylindrical portion 16 has a slot or aperture 22 that may take the form of a rectangular slot preferably 5-13 mm wide and typically 10-30 mm long. The cross sectional area of the slot or aperture is preferably between 20 mm$^2$ and 400 mm$^2$; more preferably between 100 mm$^2$ and 200 mm$^2$; and most preferably about 150 mm$^2$. Slots of this size range, located in the lower portion or floor portion, prevents any appreciable loss of seed by free flow through the port when a bird is not feeding; such slots also present a small amount of seed on the floor portion from which a bird can feed.

Alternatively, aperture 22 may comprise a non-rectangular aperture; for example the aperture may present a circular or elliptical in shape area of seed to a bird.

Feed distributor 12 may have a non-circular cross section; for example it may have a square, rectangular, hexagonal or octagonal cross section. In any event it will have a lower portion or floor portion. In contrast, known ports typically have only a roof portion and sometimes side portions.

Flange 14 presents a circular orifice 24 via which, in use, a bird may access seed with its beak from the bird feeder. The upper portion of flange 14 has a hood 26 that is positioned so that in use it shields the aperture against rainfall and thus helps keep bird feed dry. The lower portion of flange 14 has a U-shaped recess 28 in each side. These recesses provide pivot means for a perch assembly (not shown). Between the recesses 28 there is an integral central portion 30 that has a raised front face 32. The bottom rear of the flange 14 also has a protruding notch 34 that, in use, locates a hole in the main body of the bird feeder, in order to prevent tilting movement of the port when inserted in the outer wall of a bird feeder body.

Frustroconical portion 18 has an aperture 36 of hexagonal cross section leading to a smaller cylindrically shaped aperture 38. This allows two ports to be fixed back to back; fastened for example, by means of a nut and bolt. In this case the bolt would be sized to closely fit hexagonal aperture 36 and the diameter of cylindrical aperture 38 would be such that the thread but not the head of the bolt could pass therethrough. While a frustroconical portion 18 is preferred, other shapes are possible. For example; portion 18 could be replaced by a circular end wall located at the inner end of cylindrical portion 16 or could be hemispherical (or similarly) shaped. Further, apertures 36 and 38 are optional and would not be appropriate for use with bird feeders that did not employ diametrically adjacent ports.

Figure 7:
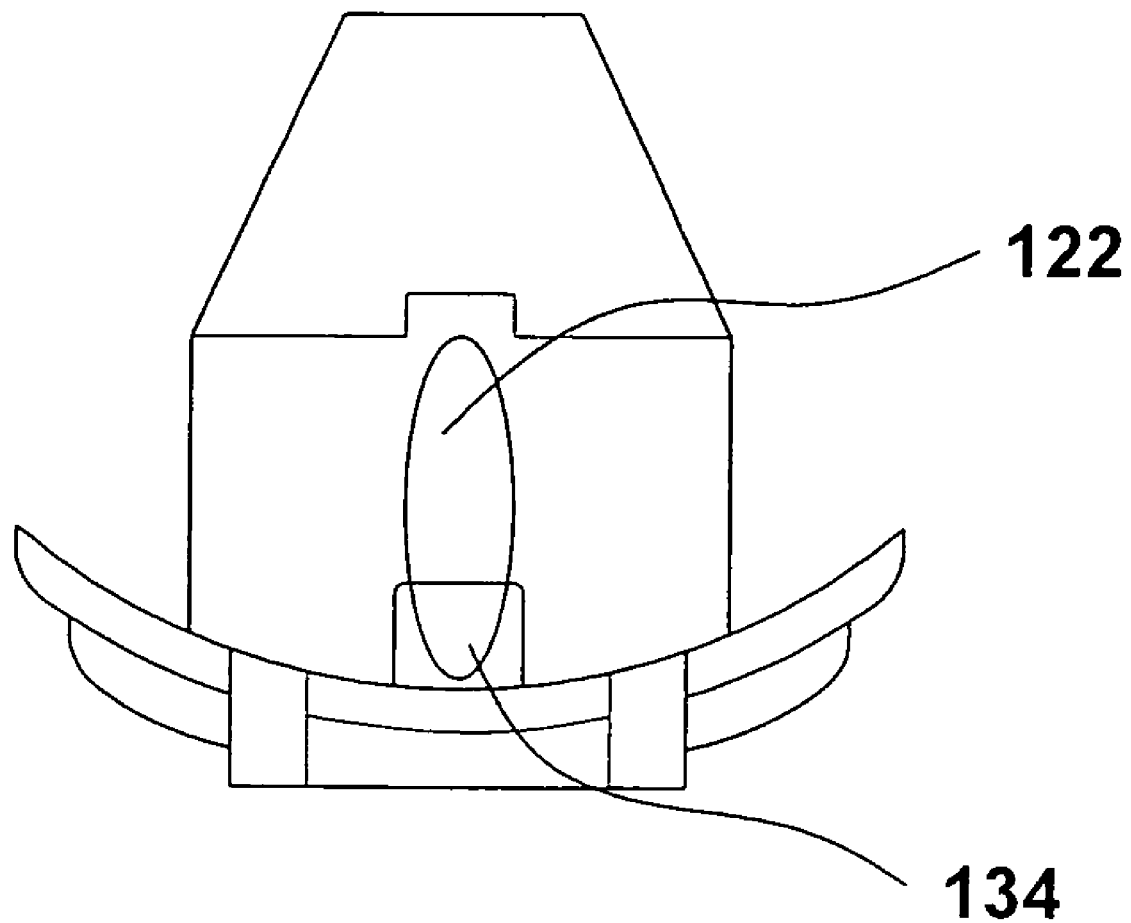
FIG. 7 shows an underside view of a seed port according to a further embodiment of the invention.

FIG. 7 shows an underside view of a seed port according to a further embodiment of the invention where the slot 122 is elliptical in shape.

I claim:

1. A bird feeder port, for insertion through an exterior wall of a bird feeder for dispensing fine sized bird seed, comprising:
   a feed distributor with an open front portion accessible to a bird and having at least one of a roof portion, a wall portion and a lower surface portion, said lower surface portion including a floor portion defining a lowermost surface of the feed distributor; and
   an aperture located in said floor portion, wherein, in use, fine sized bird seed is presented and flows through said aperture in said lower surface portion so that bird seed can be eaten by a feeding bird;
   wherein the aperture is rectangular or elliptical in shape; and
   wherein said aperture has a width in the range 5 to 13 mm.

2. A bird feeder port according to claim 1 wherein the aperture is circular in shape.

3. A bird feeder port according to claim 1 wherein the aperture has a width in the range 7 to 11 mm.

4. A bird feeder port according to claim 1 wherein the aperture has a width in the range 8 to 10 mm.

5. A bird feeder port according to claim 1 wherein the aperture has a length in the range 10 to 30 mm.

6. A bird feeder port according to claim 1 wherein the aperture has a length in the range 12 to 25 mm.

7. A bird feeder port according to claim 1 wherein the aperture has a length in the range 12 to 20 mm.

8. A bird feeder port according to claim 1 wherein the aperture has an area between 20 mm$^2$ and 400 mm$^2$.

9. A bird feeder port according to claim 1 wherein the aperture has an area between 100 mm$^2$ and 200 mm$^2$.

10. A bird feeder port according to claim 1 wherein the feed distributor is formed, in at least part, from a cylinder.

11. A bird feeder port according to claim 1 wherein the feed distributor is formed, in at least part, from a frustroconical shell.

12. A bird feeder port according to claim 1 comprising a flange portion that in use is located adjacent the outer wall of a bird feeder.

13. A bird feeder comprising a main body, in which bird-food may be stored, and a port inserted through an exterior wall of said main body, said port further comprising a feed distributor with an open front portion accessible to a bird and having at least one of a roof portion, a wall portion and a lower body portion, said lower body portion including a floor portion defining a lowermost surface of the feed distributor; an aperture located in said floor portion, through which aperture bird seed is in use presented and can be eaten by a feeding bird; wherein the aperture is rectangular or elliptical in shape; and said aperture has a width in the range 5 to 13 mm.

* * * * *